(12) United States Patent
Cammert et al.

(10) Patent No.: US 9,659,063 B2
(45) Date of Patent: May 23, 2017

(54) SYSTEMS AND/OR METHODS FOR EVENT STREAM DEVIATION DETECTION

(75) Inventors: Michael Cammert, Wettenberg (DE); Christoph Heinz, Marburg (DE); Jürgen Kramer, Alsfeld (DE); Tobias Riemenschneider, Schwalmstadt (DE)

(73) Assignee: SOFTWARE AG, Darmstadt (DE)

( * ) Notice: Subject to any disclaimer, the term of this patent is extended or adjusted under 35 U.S.C. 154(b) by 1731 days.

(21) Appl. No.: 12/971,459

(22) Filed: Dec. 17, 2010

(65) Prior Publication Data

US 2012/0158360 A1  Jun. 21, 2012

(51) Int. Cl.
*G06F 17/18*  (2006.01)
*G06F 17/30*  (2006.01)

(52) U.S. Cl.
CPC .. *G06F 17/30516* (2013.01); *G06F 17/30536* (2013.01); *G06F 17/30548* (2013.01)

(58) Field of Classification Search
CPC .............. G06F 17/18; G06F 17/30516; G06F 17/30548; G06F 17/30536
USPC ........................................................ 702/179
See application file for complete search history.

(56) References Cited

U.S. PATENT DOCUMENTS

| | | | |
|---|---|---|---|
| 4,344,142 A * | 8/1982 | Diehr, II ............. | B29C 35/0288 264/325 |
| 6,732,064 B1 * | 5/2004 | Kadtke et al. ................ | 702/189 |
| 7,333,923 B1 * | 2/2008 | Yamanishi ....... | G06Q 10/06395 702/179 |
| 7,783,744 B2 * | 8/2010 | Garg et al. ..................... | 709/224 |
| 7,974,896 B2 * | 7/2011 | Busse et al. .................... | 705/35 |
| 9,286,345 B2 * | 3/2016 | Bandholz .......... | G06F 17/30395 |
| 2002/0059151 A1 * | 5/2002 | Soufian et al. ................. | 706/15 |
| 2003/0130967 A1 * | 7/2003 | Mannila .................. | G06F 17/15 706/1 |
| 2005/0163346 A1 * | 7/2005 | van den Bergen | G06K 9/00771 382/103 |
| 2005/0251532 A1 * | 11/2005 | Radhakrishnan . | G06F 17/30787 |
| 2006/0140497 A1 * | 6/2006 | Kondo ................ | G06K 9/4609 382/254 |
| 2006/0217939 A1 * | 9/2006 | Nakata .................... | G06F 17/18 702/189 |
| 2007/0136239 A1 * | 6/2007 | Lee et al. .......................... | 707/2 |
| 2007/0226175 A1 | 9/2007 | Resnic et al. | |
| 2007/0280006 A1 * | 12/2007 | Aoyama ........... | G06F 17/30551 365/189.15 |

(Continued)

OTHER PUBLICATIONS

Silverman, Density Estimation for Statistics and Data Analysis, 1986, pp. 1-22.*

(Continued)

*Primary Examiner* — John Breene
*Assistant Examiner* — Mohammed Islam
(74) *Attorney, Agent, or Firm* — Nixon & Vanderhye P.C.

(57) ABSTRACT

Certain example embodiments described herein relate to systems and/or methods for event stream deviation detection. More particularly, certain example embodiments described herein relate to maintaining short and long-term statistics of an incoming stream of event data. In certain example embodiments, a deviation is calculated based at least in part on the long-term and short-term statistics. The deviation may then be compared to a threshold value. In certain example embodiments, the estimations required for the statistics are done with Kernel Density Estimators (KDEs).

23 Claims, 4 Drawing Sheets

(56) References Cited

U.S. PATENT DOCUMENTS

| | | | |
|---|---|---|---|
| 2008/0013784 A1* | 1/2008 | Takeshima et al. | 382/100 |
| 2008/0043871 A1* | 2/2008 | Latouche | H04L 27/186 375/261 |
| 2008/0071904 A1* | 3/2008 | Schuba et al. | 709/224 |
| 2008/0109731 A1* | 5/2008 | Chang et al. | 715/736 |
| 2008/0186225 A1* | 8/2008 | Didier | 342/195 |
| 2008/0267083 A1* | 10/2008 | MacCormick | H04L 43/04 370/252 |
| 2009/0024622 A1* | 1/2009 | Chkodrov et al. | 707/6 |
| 2009/0060353 A1* | 3/2009 | Saisan et al. | 382/224 |
| 2009/0086755 A1* | 4/2009 | Chen et al. | 370/468 |
| 2009/0222472 A1* | 9/2009 | Aggarwal et al. | 707/102 |
| 2009/0265336 A1* | 10/2009 | Suntinger et al. | 707/5 |
| 2010/0061251 A1* | 3/2010 | Nassor et al. | 370/242 |
| 2010/0131543 A1* | 5/2010 | Chkodrov et al. | 707/765 |
| 2011/0029463 A1* | 2/2011 | Forman et al. | 706/12 |
| 2011/0095885 A9* | 4/2011 | Nielsen et al. | 340/540 |
| 2011/0196647 A1* | 8/2011 | Perala et al. | 702/150 |
| 2011/0239229 A1* | 9/2011 | Meijer et al. | 719/318 |
| 2012/0062641 A1* | 3/2012 | DeJong | B41J 15/16 347/19 |
| 2012/0089626 A1* | 4/2012 | Goranson | 707/756 |
| 2012/0115522 A1* | 5/2012 | Nama et al. | 455/501 |
| 2012/0195375 A1* | 8/2012 | Wuebbolt | 375/240.05 |

OTHER PUBLICATIONS

Heinz, Density Estimation over Data Streams, 2007.*
Supreme Court, *Alice Corp.* Vs *CLS et. al*, Oct. 2013, pp. 1-21.*
Probability Density Functions, 2010.*
Christoph Heinz et al., "Cluster Kernels: Resource-Aware Kernel Density Estimators over Streaming Data," IEEE Transactions on Knowledge and Data Engineering, vol. 20, No. 7, Jul. 2006, pp. 880-893.
Sumantra R. Kundu et al., "An Architectural Framework for Accurate Characterization of Network Traffic," IEEE Transactions on Parallel and Distributed Systems, vol. 20, No. 1, Jan. 2009, pp. 111-123.
*Density estimation over data streams*, phd thesis, Christoph Heinz.
Business Activity Monitoring mit Stream Mining am Fallbeispiel TeamBank AG, Christoph Heinz, Torsten Greiner, HMD: Praxis der Wirtschaftsinformatik Heft 268.
Detecting Stream Events in Distributed Streams, Jiajia Miao, Zhuxi Zhang, Zhijian Yuan, Yan Jia, Quanyuan Wu, 2008 Second International Conference on Future Generation Communication and Networking Symposia.
Online anomaly detection using KDE, T. Ahmed, GLOBECOM 2009.
Probability Density Estimation over evolving data streams using Tilted Parzen Window, Hong Shen Xiao-Long Yan, ISCC 2008.
Distributed Deviation Detection in Sensor Networks, T. Palpanas, D. Papadopoulos, V. Kalogeraki, D. Gunopulos, ACM SIGMOD Record, vol. 32, Issue 4.
Online outlier detection in sensor data using non-parametric models, S. Subramaniam, T. Palpanas, D. Papadopoulos, V. Kalogeraki, D. Gunopulos, VLDB 2006.
Detecting distance-based outliers in stream of data, F. Angiulli, F. Fassetti, CIKM 2007.
Mining data streams under block evolution, V. Ganti, J. Gehrke, R. Ramakrishnan, ACM SIGKDD Explorations 2003.
Efficient Clustering-Based Outlier Detection Algorithm for Dynamic Data Stream, M. Elahi, L. Kun, W. Nisar, L. Xinjie, W. Hongan, FSKD 2008.
SPOT: A System for Detecting Projected Outliers From High-dimensional Data Streams, J. Zhang, Q. Gao, H. Wang, ICDE 2008.
On Abnormality Detection in Spuriously Populated Data Streams, Charu C. Aggarwal, IBM T.J. Watson Research Center.

* cited by examiner

SYSTEMS AND/OR METHODS FOR EVENT STREAM DEVIATION DETECTION

FIELD OF THE INVENTION

Certain example embodiments described herein relate to systems and/or methods for event stream deviation detection. More particularly, certain example embodiments described herein relate to complex event processing (CEP) where event streams are analyzed and deviations can be detected. In certain example embodiments, a CEP engine receives one or more event stream(s) and uses density-based deviation detection to detect deviations within the event stream(s). Certain example embodiments relate to trend, outlier, and/or deviation detection in the context of complex event processing, event stream processing, data stream processing, stream mining, and/or the like.

BACKGROUND AND SUMMARY OF EXAMPLE EMBODIMENTS OF THE INVENTION

Complex event processing (CEP) applications typically handle transient event data arriving at very high rates. A CEP engine continuously analyzes incoming event streams by means of filtering, aggregation, correlation, etc., to thereby deliver business relevant patterns on the fly.

The event streams consumed by CEP applications typically do not have a stable and constant behavior over time. Indeed, the event streams may temporarily deviate from expected behavior. The deviations in the event streams may be either an opportunity or a threat in the corresponding CEP application. Accordingly, the early detection of deviations in event streams may be advantageous (e.g., of high value) for a business tied into or otherwise somehow relying or depending in some way on the event streams.

Because of event stream processing requirements, it will be appreciated that it would be desirable to provide well-founded analysis results based on detections of deviations in an event stream. Similarly, it also will be appreciated that it would be desirable to derive such results in an online (e.g., real-time, in-flight, non-stored, etc.) manner. In certain instances, the characteristics of the stream(s) being processed may not be known in advance, the detection may not have prior knowledge on the characteristics of the stream available, etc.

Currently, there are various conventional techniques for detecting irregularities in a given set of data.

One conventional approach is to use a database to explore characteristics and irregularities of a data set in a database. Using a programming language such as, for example, SQL, or with data mining algorithms on top of the database, the data set and its corresponding features can be analyzed. Unfortunately, however, a database approach may not always be feasible in the context of processing a high-volume, low-latency event stream. In such cases, the data typically arrives faster than the database system can process and answer queries. Further, a data mining approach may not be feasible because of typically high computational requirements. Data mining algorithms may require multiple runs over the data, which is typically not possible in a CEP scenario, where the event streams are potentially unbounded and continuously stream in.

CEP applications generally impose rigid processing requirements like a single pass over the stream or limited computational resources. Thus, CEP engines typically process incoming events incrementally. Usually, CEP engines follow a SQL, rule-based, or state-based approach, typically extended by temporal clauses. Those clauses may allow the event stream analysis to be restricted or limited to a temporal window. For example, this allows computing the maximum price of a stock over the previous 10 minutes or other time intervals. Thus, depending on the setting of the time window, a user can place an emphasis on analyzing more recent data.

CEP engines that are SQL-based may utilize specific SQL functionality for deviation detection. SQL provides aggregates including, for example, MIN, MAX, VAR, AVG, etc. To detect a deviation, a continuous SQL query could, for example, compute the deviation of the current value from the Bollinger bands. The Bollinger band may define an envelope of two standard deviations around the average. If a new value is outside the bands, it is classified as a deviation. However, this approach has limitations, as it requires a normal distribution of the data to produce reliable analysis results.

Further, the standard SQL aggregates are of a limited expressiveness. For instance, they only provide empirical summary measures of the underlying distribution, but cannot be readily used to detect irregularities or multiple modes of the distribution. The approach using the Bollinger bands described above, for example, assumes a normal distribution of the event stream, an assumption that may not hold for arbitrary streams. As a consequence, the results for a non-normal distribution may be of low quality as they also may not include irregularities or multiple modes of the stream distribution.

CEP engines based on rules or states are also likely to provide simple aggregates like the above-mentioned SQL functionality. The rules or states may then also use those aggregates to detect deviations from the average behavior. Thus, with CEP engines based on rules or states, the problems associated with a SQL-based CEP engine may still apply to rule/state based engines. Standard aggregates typically only provide summary measures, which do not detect irregularities of the distribution or multiple modes.

Another relatively new technique that may hold promise is stream mining. Stream mining analyzes event streams in an online manner. However, work in this area is in its infancy and more work is needed.

Thus, it will be appreciated that there is a need in the art for improved systems and/or methods for detecting event stream deviation that is, for example, provided to a CEP application or the like.

One aspect of certain example embodiments relates to calculating the deviation in an event stream over at least two windows of time. In certain example embodiments, one of the time periods may encompass the complete event stream.

Another aspect of certain example embodiments relates to estimating deviations in event streams through the use of kernel density estimators (KDEs).

Another aspect of certain example embodiments relates to a notification being sent when a deviation in an event stream occurs.

Yet another aspect of certain example embodiments relates to calculating a deviation between an ideal behavior of an event stream and a short-term calculation of the event stream behavior.

Yet another aspect of certain example embodiments relates to calculating a deviation between an ideal behavior of an event stream and a long-term calculation of the event stream behavior.

Still another aspect of certain example embodiments relates to comparing a deviation of a long-term time window to a deviation in a short-term time window.

Still another aspect relates to comparing a deviation of an event stream with a threshold value.

In certain example embodiments, a deviation detection method for use with a processing system including at least one processor is provided. At least one stream of event data is received at the processing system, with the event data including at least one attribute. A long-term statistic corresponding to a first estimate of a probability density function (PDF) of at least one monitored attribute in the at least one stream of event data over a first time window is calculated. A short-term statistic corresponding to a second estimate of the PDF of the at least one monitored attribute in the at least one stream of event data over a second time window is calculated, with the second time window being of a shorter duration than the first time window. First and second distances between an ideal PDF and the long- and short-term statistics, respectively, are computed. A current deviation is computed based at least in part on the first and second distances. The current deviation is compared to a threshold value. The above is repeated as further monitored events are delivered by the at least one stream of event data.

In certain example embodiments, a deviation detection method for use with a processing system including at least one processor is provided. At least one stream of event data is received at the processing system. A short-term kernel density estimator (KDE) is maintained, over a first time period, for at least one monitored event in the at least one stream of event data. A long-term KDE is maintained, over a second time period, for the at least one monitored event in the at least one stream of event data. A deviation from at least one predefined probability density function (PDF) is calculated in dependence on the short- and long-term KDEs. The deviation is compared to a threshold to detect an event stream deviation.

There also are provided in certain example embodiments non-transitory computer readable storage mediums tangibly storing instructions that, when processed by at least one processor, execute the above-described and/or other methods.

Similarly, there also are provided in certain example embodiments systems that include adapters configured to receive at least one stream of event data and processors configured to execute the above-described and/or other methods. Data stores may be provided in certain example implementations to log information about detected deviations. Such information may include, for example, the time/date of the deviation, the expected value or range of values, the observed value or range of values, etc.

These aspects and example embodiments may be used separately and/or applied in various combinations to achieve yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

The following description is provided in relation to embodiments which may share common characteristics, features, etc. It is to be understood that one or more features of any embodiment may be combinable with one or more features of other embodiments. In addition, single features or a combination of features may constitute an additional embodiment(s).

In certain example embodiments, a computer implemented algorithm is provided to detect deviations from the expected stream behavior for real-valued data streams on-the-fly (e.g., detection of attributes of an event stream). Techniques from the area of nonparametric statistics, e.g., density estimators, may be used to estimate the value distribution of a supplied event stream in certain example implementations. The distribution provided by these techniques may deliver a compact and concise statistical model of the stream of real-valued data and/or an attribute of the stream. In certain example embodiments, by combining multiple density estimators computed with respect to different time horizons, deviations may be detected in the stream on a fine-granular temporal resolution. Further, in certain example embodiments, following the CEP processing paradigm, deviations may be detected online (e.g., on the fly, in real-time) and may be directly reported to the user (e.g., through a notification or a user interface). Additionally, or in the alternative, in certain example embodiments, details on the detected deviations as well as an intuitive visualization may be provided.

In certain example embodiments, a component of the deviation detection is the value distribution of an attribute of a real-valued event stream. In certain example embodiments, the value distribution is a probability density function (PDF) and may provide all or substantially all of the characteristics of a given data set. In other words, the density of the underlying attribute of a real-valued event stream data may be unknown, and may have to be estimated. Accordingly, in certain example embodiments, a kernel density estimator (KDE) may be used. As is known, a kernel is a weighting function used for estimating, and KDEs are forms of nonparametric statistics that allow for estimating the probability density function of a random variable. As such, one feature of KDEs is that they may be assumption-free, e.g., they may not require prior knowledge of the stream of which they are estimating. Thus, KDEs may in certain example implementations provide well-defined estimates for attributes of arbitrary real-valued event streams.

In certain example embodiments, the detection deviation in an event stream may be based on three continuously maintained KDEs. First, an ideal density may be defined by a user (e.g., an operator) that models the ideal behavior of the stream. Second, a long-term KDE may be continuously computed with respect to the complete stream (or a temporally substantial portion of the stream). Further, the long-term KDE may model the long-term tendencies of the stream. Third, a short-term KDE may be continuously computed with respect to a (relatively) short time window. Similar to the long-term KDE, the short-term KDE may continuously or substantially continuously model the short-term tendencies of the stream. In certain example embodiments, the time window may be approximately one hour, but may vary depending on application requirements, user preferences, the nature of the monitored parameter(s), etc. Example time windows and their implementations are discussed in greater detail below.

In certain example embodiments, the runtime of an application may continuously or substantially continuously monitor the differences between the long- and short-term KDEs and the ideal density of a given event stream. The difference of the long-term KDE to the ideal density may be the expected and typical deviation of the stream. The difference of the short-term KDE to the ideal density may be the current deviation of the stream. Thus, if the difference between expected and current deviation is too high, the application may report a bona fide deviation or a deviation of concern. A user may control the sensitivity of the application by setting a threshold for a tolerated deviation in certain example embodiments, e.g., using a suitable user interface.

Accordingly, a deviation detection application may run in an online (e.g., real-time, or on-the-fly) manner. As such, when a new event is streamed into the application, the estimators may be incrementally updated, the differences of the KDEs may be computed, and detected deviations may be reported to a user, external application, etc. Furthermore, the KDEs may be visualized continuously or substantially continuously in certain example implementations to give the user a concise live or substantially live view of the current behavior of the stream that is being monitored by the application. This live or substantially live view may help provide the user with an intuitive basis for adjusting thresholds, time horizons, etc.

An application running the algorithm discussed above (or any other suitable algorithm) may compute KDEs in an online manner, e.g., with one KDE over a time window and one over the complete stream (or a larger portion of the complete stream, when compared to the short version).

Generally, a KDE has parameters that include a kernel function and a bandwidth. A KDE may be computed over a set of values (e.g., an event stream) and may deliver a mathematically well-founded estimate of the value distribution. In certain example embodiments, a KDE algorithm uses the Epanechnikov kernel as a kernel function and the Normal Scale Rule as a bandwidth. It will be appreciated that other example embodiments may use other kernel/bandwidth settings in place of, or in addition to, these settings. Other kernel functions may include, for example, uniform, triangle, quartic, tricube, Gaussian, and cosine kernel functions. The equations for the kernel functions may be defined as follows:

TABLE 1

| | |
|---|---|
| Epanechnikov | $K(u) = \frac{3}{4}(1 - u^2) 1_{\{|u| \leq 1\}}$ |
| Uniform | $K(u) = \frac{1}{2} 1_{\{|u| \leq 1\}}$ |
| Triangle | $K(u) = (1 - |u|) 1_{\{|u| \leq 1\}}$ |
| Quartic | $K(u) = (\frac{15}{16})(1 - u^2)^2 1_{\{|u| \leq 1\}}$ |
| Tricube | $K(u) = (\frac{35}{32})(1 - u^2)^3 1_{\{|u| \leq 1\}}$ |
| Gaussian | $K(u) = 1/\sqrt{(2\pi)} e^{-\frac{1}{2}u^2}$ |
| Cosine | $K(u) = (\pi/4) \cos((\pi/2)u) 1_{\{|u| \leq 1\}}$ |

In such formulas, $K(u)$ may represent the kernel function, and $1_{\{\ldots\}}$ may represent the indicator function.

In certain example embodiments, the evaluation of a KDE may require access to all values of a corresponding data set (e.g., the event stream). For example, evaluation of a KDE in the context of CEP may require access to all of the values/events that are continuously streaming in. Also in the CEP context, as time passes, the continuous stream of events may further increase the data the KDE is computed with respect to.

It will be appreciated that for the above-described long-term KDE that storage of the complete event stream may or may not be infeasible. Accordingly, in certain example embodiments, the algorithm for an application may utilize Cluster Kernels. Cluster Kernels may continuously or substantially continuously keep summaries of partitions of an event stream and use the summaries to re-sample the partition events. The evaluation of the re-sampled events in the partitions may in turn approximate the KDE over all processed events. Accordingly, Cluster Kernels advantageously may approximate KDEs with a low approximation error. Also, Cluster Kernels may be incrementally updated. For example, the estimator may be updated for a new event without being recomputed from scratch. In certain example embodiments, in order to exclude older data, the Cluster Kernels may be reset after a period of time. For example, the Cluster Kernels may be reset once per month.

With respect to the short-term KDE over a time window, this KDE may be based on the events currently within the timeframe of the window. Accordingly, a new event may enter the window and older events may fall out of the specified time frame and be removed from the window. The KDE may be analogously updated in an incremental manner, e.g., the older events leaving the window may be removed from the internal state of the KDE and the new events may be inserted into the KDE.

In certain example embodiments, four settings may define the operational parameters of an algorithm used in an application to monitor event stream deviation.

A first setting may be the ideal value distribution of the event stream. In certain example embodiments, this may be a normal distribution with the mean as the ideal value and a very small standard deviation, which could model the maximum allowed tolerance. Thus, the distribution may have the form of a peek. Alternatively, or in addition, multiple ideal values may be used. The ideal distribution with multiple values may be defined as sum of normal distributions with those values as means and a small variance. In certain example embodiments, the multiple ideal values may have different weights. In such a case where the ideal values have different weights (e.g., value 1 occurs twice as much as value 2), then a weighted sum of the normal distributions can be used with the weights set accordingly.

A second setting refers to the time window of the short-term estimator (e.g., the short term KDE). In certain example embodiments, the stream rate may be additionally considered, as the product of the stream rate and the time window size may equal the average number of events in the window. If the average number of events in the window is too high, the time for update and evaluation of the KDE might be greater than the time between the arrivals of two events. Accordingly, an application may not be able to keep pace with the event stream.

A third setting may be the measure of deviation. In certain example embodiments, an arbitrary (e.g., a predetermined, user-specified, or the like) distance measurement for an attribute of a real-valued functions can be used. This value may be the integral of the absolute difference between two functions. For example, because KDEs are densities and thus may integrate to 1, this measurement may deliver for KDEs distances in the interval [0, 2]. Thus, the current deviation may be also in the interval [0, 2].

A fourth setting may be a threshold for the deviation measurement. In certain example embodiments, the sensitivity of the algorithm may be controlled with this parameter. For example, when a low threshold is set, more deviations may be reported. It will be appreciated that this setting may be application dependent (e.g., as applied to the real-world streaming event data). In certain example embodiments, the deviation detection algorithm may be extended to examine different threshold settings and let the user assess the detected deviations. In certain example embodiments, a learning algorithm may be applied to these threshold/deviation combinations. Thus, the main algorithm and its associated application may adapt to a given application scenario and suggest concrete threshold values to a user.

The example parameters listed above are defined as follows for the subsequent algorithm:

TABLE 2

| Parameter | Description |
|---|---|
| $f_{ideal}$ | The ideal density |
| $f_{short}$ | The estimated short-term KDE |
| $f_{long}$ | The estimated long-term KDE |
| dist(f, g) | The distance function measuring the similarity of two functions f and g |
| dev | The current deviation |
| t | The threshold for the deviation |
| $dev_{rel}$ | The measure of relative deviation |

In certain example embodiments, the algorithm may be expressed for a given input of continuously arriving real-valued events e1, e2, etc. In the algorithm, when a deviation is detected, the output values are the relative deviation $dev_{rel}$, the actual deviation $dist(f_{ideal}, f_{short})$, and the current trend $dist(f_{long}, f_{short})$. Accordingly, the algorithm may be expressed as follows:

```
1: for each incoming event e do
2:     update f_short for e;
3:     update f_long for e;
4:     compute dist(f_ideal, f_short);
5:     compute dist(f_ideal, f_long);
6:     compute dev = | dist(f_ideal, f_short) − dist(f_ideal, f_long) |;
7:     if (dev > t)
8:         compute dev_rel=| (t−dev) / t |;
9:         return dev_rel, dist(f_ideal, f_short), dist(f_ideal, f_short);
```

Figure 1:
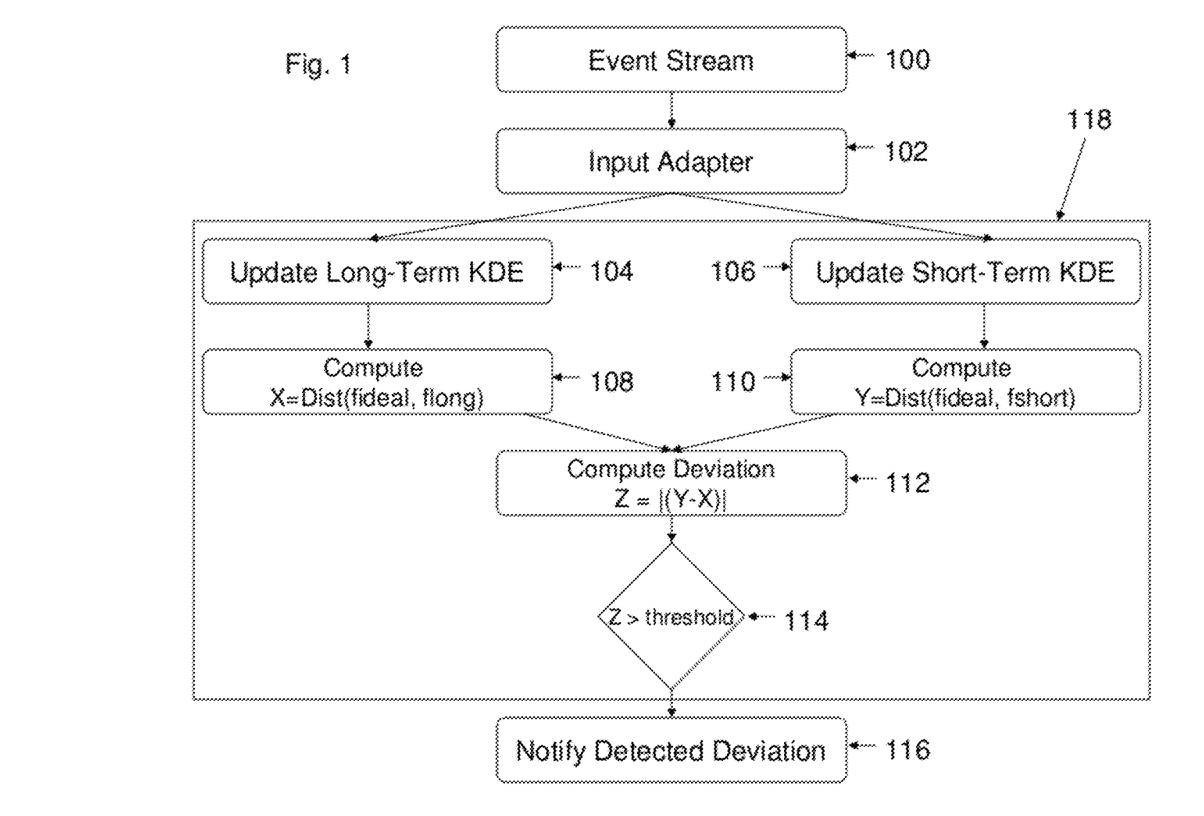
FIG. 1 is an example flowchart illustrating the processing flow of deviation detection according to certain example embodiments.

FIG. 1 is an example flowchart illustrating the processing flow of density-based deviation detection according to certain example embodiments. An event stream 100 is fed into an input adapter 102 that communicates with, for example, a CEP engine. The input adapter 102 may convert arriving events into an internal format. A deviation detection operator 118 running in, for example, a CEP engine is configured to continuously receive data from the input adapter 102. For each processed event, the KDEs are updated, and the distances between the ideal distribution and KDEs are computed. Specifically, at step 104 the long-term KDE is updated. In addition, at step 106, the short-term KDE is updated. Next, in step 108, once the long-term KDE is updated, the distance between the ideal density and the long-term density is computed. Also, the distance between the ideal density and the short-term density is computed in step 110. It will be appreciated that the long- and short-term KDE computation processes may take place serially, in parallel, or in a substantially parallel fashion in different embodiments.

With the two distances between the ideal density computed, the deviation between the two is then computed (e.g., "Z") in 112. An assertion may then be checked in step 114, e.g., to determine whether the calculated deviation is greater than a threshold value. In certain example embodiments, the threshold value may be a predetermined value, e.g., set by a user, averaged over a period of time, suggested by the system (for example, based on historical data), etc. In certain example embodiments, the threshold value may be a value that is dynamically created and/or updated based upon external or internal characteristics of, for example, the event stream itself.

If the assertion is true, then a notification or other action may be sent in step 116. The notification may include details concerning the deviation that has been detected. For instance, the date/time of the deviation, the severity of the deviation, the event that caused the deviation, etc., may be reported. Further, a user or non-user process may perform additional calculations to determine a suggested or recommended course of action (e.g., trigger a subsequent business process, shut down a machine, etc. . . . ), and this also may be provided to the user.

Figure 2:
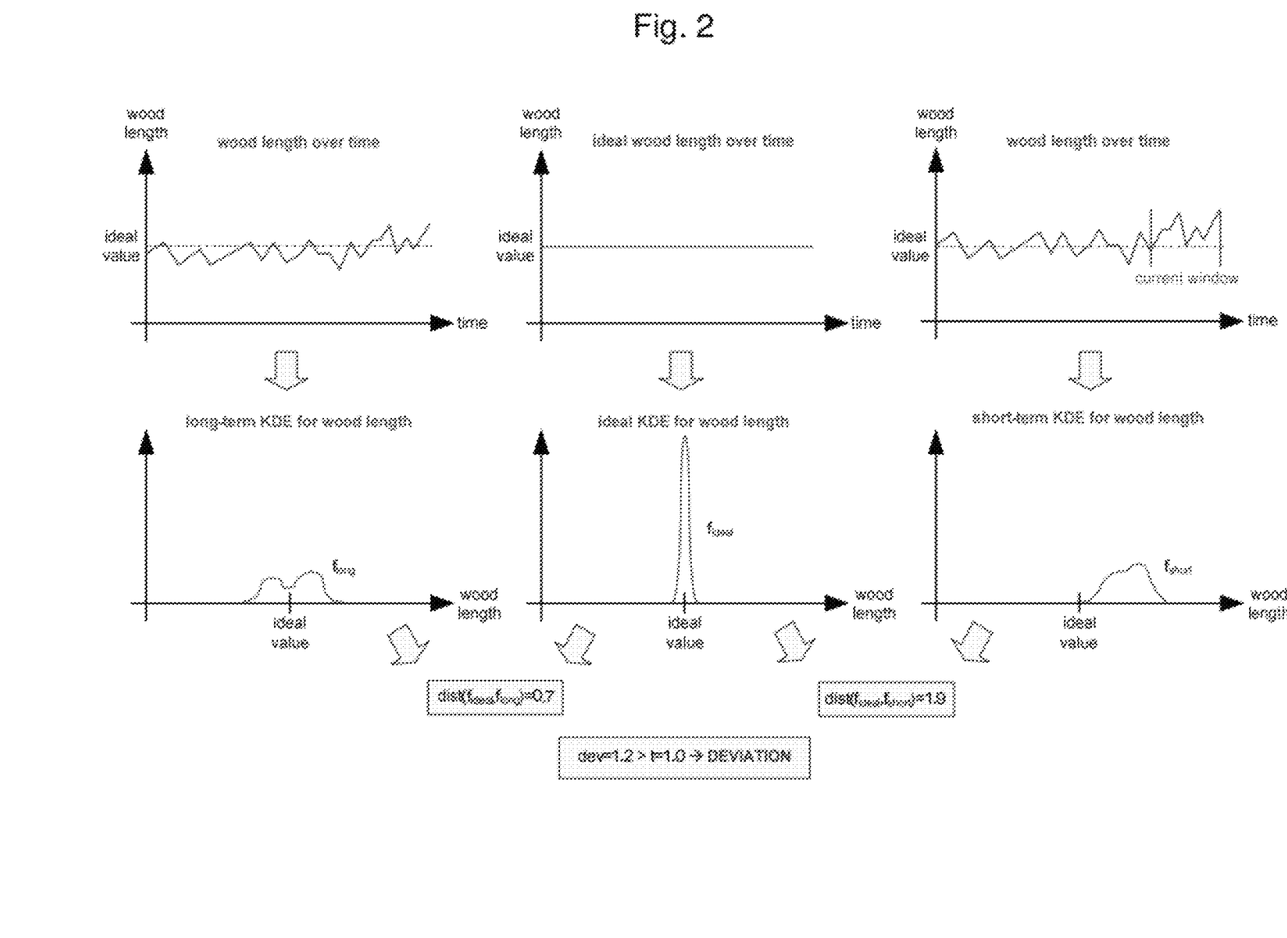
FIG. 2 shows example graphs and density-based deviation calculations in accordance with certain example embodiments.

FIG. 2 shows example graphs and density-based deviation calculations in accordance with certain example embodiments. More particularly, the FIG. 2 example relates to industrial tree cutting. Conventionally, in such an application, a target wood length may be defined. However, the actual cut length may deviate from the target length. This deviation may be related to, for example, abrasion of the sawing blade or other factors. It will be appreciated that changing a given saw blade may create delays in the form of a change-over time (e.g., when the saw is not in operation) and additional costs (e.g., related to the replacement blade). Accordingly, it also will be appreciated that it may be desirable to keep using a saw blade as long as possible when the deviations are within a certain range that is deemed acceptable. Accordingly, the techniques described herein may be applied in order to help establish an automatic recommendation system of when a given saw blade(s) may be changed.

FIG. 2 provides an illustrative view related to the above steps of the algorithm shown in FIG. 1. The leftmost top and bottom graphs provide the real world events and a calculated long-term KDE based on those events. The middle top and bottom graphs show the ideal (e.g., target) values for the cut length of wood. In the FIG. 2 example, the ideal wood length is constant and, thus, the distribution is normal about the uniform value (which also is the mean and median value here) with a low standard deviation. The rightmost top and bottom graphs show the real world events with the short-term calculated KDE. The calculations at the bottom of FIG. 2 respectively show the distance and deviation calculations.

As shown in FIG. 2, the long-term KDE shows that there are two length areas, indicated by the two density areas. The ideal value is slightly left to the expectation value of the KDE. Further, the short-term KDE shows a right-shifted deviation in the current window. Thus, the short-term KDE with its window may show that the cutting process is producing parts that are too long when compared to the ideal value. Accordingly, by the comparison of distances between the real-time KDEs and the ideal PDF a deviation may be automatically observed. For instance, with reference to the calculations in FIG. 2, the short-term deviation is 1.9, and the long term deviation is 0.7. The difference between these two values is 1.2, which is greater than the threshold t value of 1.0, therefore implying that there is a deviation.

Figure 3:
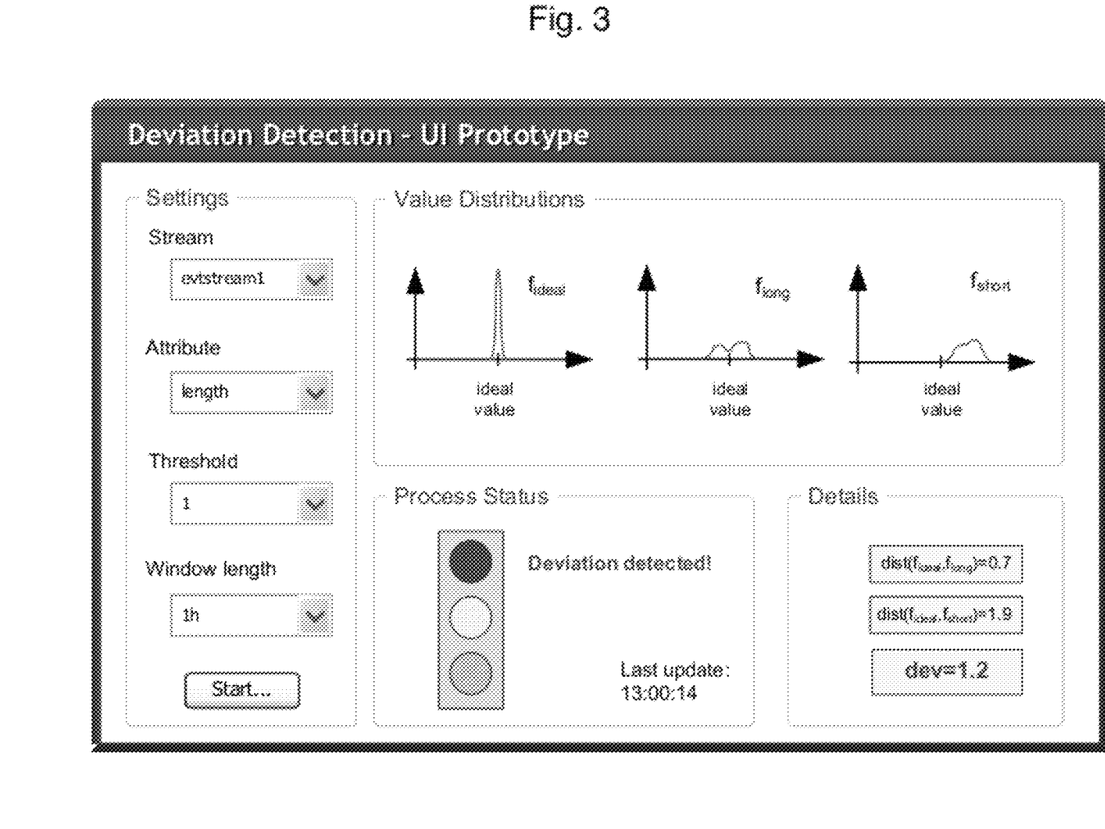
FIG. 3 is an illustrative view of a user interface (UI) of a program for detecting deviations in a provided event stream in accordance with certain example embodiments.

FIG. 3 is an illustrative view of a user interface (UI) of a program for detecting deviations in a provided event stream in accordance with certain example embodiments. Accordingly, a user may select a stream and select an attribute of that stream to monitor. The attribute may be the length of a piece of wood that is being cut, the price of a certain stock, the efficiency of an engine, etc. Further, in certain example embodiments, a user may define a threshold, and choose a window length for short-term KDE calculations. Although drop-down boxes are shown in the FIG. 3 example, other input mechanisms may be provided in place of or in addition to such drop-down boxes. A process status is presented to a user in which a visual indication of a deviation is shown (e.g., a red-light in a stoplight display, etc.). Alternatively, or in addition, the detection of a deviation may be passed on to another application, system, etc., that may carry out additional actions in response to the detected deviation.

Figure 4:
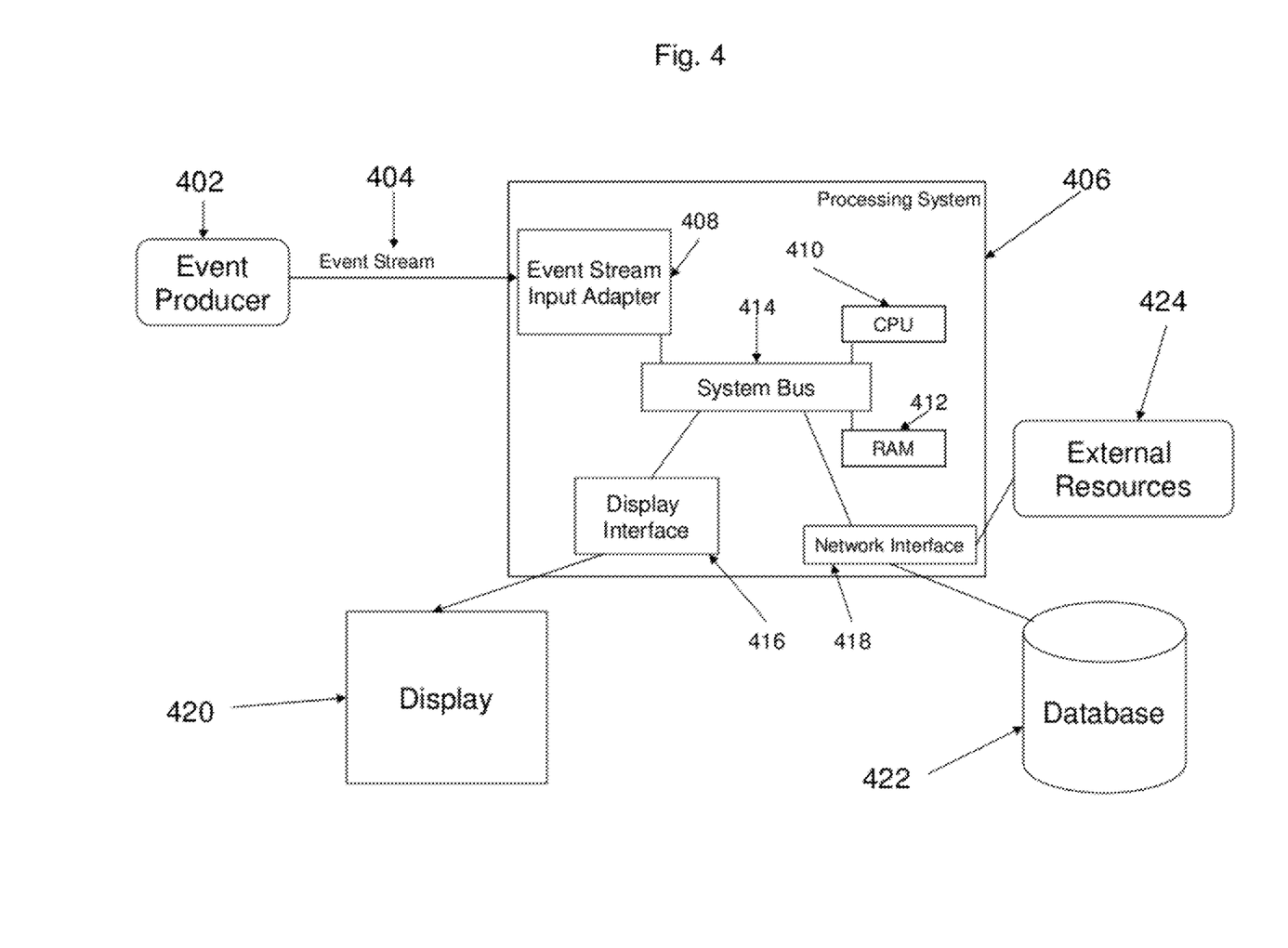
FIG. 4 shows an illustrative block diagram of a processing system implementing an example CEP process in accordance with certain example embodiments.

FIG. 4 shows an illustrative block diagram of a processing system implementing an example density-based deviation detection process in accordance with certain example embodiments. Event producer 402 may be a real world event producer that is the target of a density-based deviation detection process such as, for example, the wood cutting example described above. Event stream 404 is input from the event producer 402 into the event stream input adapter 408. The event stream input adapter is part of an overall processing system 406 in this example arrangement. The event stream 404 is received into the event stream input adapter 408 and translated into data with an internally managed structure. The data is then moved over system bus 414, stored in RAM 412, and processed by at least one processor or CPU 410. A density-based deviation detection process may be running on the processing system 406 (e.g., stored in RAM 412). Accordingly, the density-based deviation detection process may be executed by the CPU 410 with the translated data. The results (e.g., as discussed above) may then be output through various methods. As shown above, in certain example embodiments, the results of a detected deviation may be output through a display interface 416 to a display 420. Alternatively, or in addition, the results and/or data may be sent through a network interface 418 to be stored in a database 422, or the like. In certain example embodiments, the results and/or data may be passed onto external resources 424. The external resources 424 may be resources such as, for example, an external application, another processing system, a notification system (e.g., email, etc), a business process management application, or the like.

It will be appreciated that as used herein, the terms system, subsystem, service, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible computer readable storage medium. It also will be appreciated that the techniques described herein may be accomplished by having a processor execute instructions that may be tangibly stored on a computer readable storage medium.

Although certain example embodiments have been described in relation to certain estimators, it will be appreciated that other estimators may be used in connection with different example embodiments. Furthermore, although certain example embodiments have been described in connection with a single stream in a single wood cutting application, different embodiments may be used in different applications with one or more different streams. Still further, although the comparison technique of certain example embodiments described herein has been described in connection with simply subtraction and comparison to a threshold value, other example embodiments may detect deviations in different ways such as, for example, by comparing standard errors, by assessing one- or two-tailed p-values, and/or the like.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the claims.

What is claimed is:

1. A deviation detection method for use with a processing system including at least one processor, the method comprising:
   (a) receiving, at the processing system, at least one stream of event data from a machine that is generating events for the stream of event data, the event data including at least one attribute of performance of a task by the machine;
   (b) calculating, via the at least one processor, a long-term value by using a first estimate of a long-term probability density function (PDF) of the at least one monitored attribute in the at least one stream of event data over a long-term time window of the stream of event data;
   (c) calculating, via the at least one processor, a short-term value by using a second estimate of a short-term PDF of the at least one monitored attribute in the at least one stream of event data over a short-term time window that is of a shorter duration than the long-term time window;
   (d) computing, via the at least one processor, a first difference value between the calculated long-term value and an ideal density distribution value;
   (e) computing, via the at least one processor, a second difference value between the calculated short-term value and the ideal density distribution value;
   (f) computing, via the at least one processor, a current deviation as a function of the first difference value and the second difference value;
   (g) comparing the current deviation to a threshold value;
   (h) in response to the comparison of the current deviation exceeding the threshold value, triggering, in real-time with reception of the event stream, an adjustment in performance of the task being performed by the machine; and
   repeating (a)-(h) as further monitored events are generated by the machine for performance of the task and provided by the at least one stream of event data.

2. The method of claim 1, wherein the ideal density distribution of the stream of event data is based on multiple ideal values.

3. The method of claim 1, wherein the short-term value is based on a short-term Kernel Density Estimator (KDE) and the long-term value is based on a long-term KDE.

4. The method of claim 1, further comprising updating the long-term value with respect to a complete stream.

5. The method of claim 1, wherein the threshold value is specified by a user.

6. The method of claim 1, wherein the threshold value is dynamically determined by the processing system.

7. The method of claim 1, wherein the calculating of the long-term value includes using Cluster Kernels.

8. The method of claim 1, further comprising displaying a result of the comparing of the current deviation to the threshold value on a display in communication with the processing system.

9. The method of claim 1, further comprising outputting a result of the comparing of the current deviation to the threshold value to a data store or external application.

10. The method of claim 1, further comprising issuing a notification when the current deviation exceeds the threshold value.

11. The method of claim 1, further comprising updating the long-term value with summaries of re-sampled partitions of the stream.

12. A deviation detection method for use with a processing system including at least one processor, the method comprising:
receiving at least one stream of event data at the processing system and from a machine that is generating events for the stream of event data, the event data including at least one attribute of performance of a task by the machine;
calculating, over a short-term time window, a short-term kernel density estimator (KDE) for at least one monitored event in the at least one stream of event data;
calculating, over a long-term time window that is longer than the first time period, a long-term KDE for the at least one monitored event in the at least one stream of event data;
computing, via the at least one processor, a first difference value as a function of the long-term KDE and an ideal density distribution value;
computing, via the at least one processor, a second difference value as a function of the short-term KDE and the ideal density distribution value;
calculating a deviation value as a function of the first difference value and the second difference value; and
comparing the deviation to a threshold to detect a deviation in the at least one stream of event data;
in response to the comparison of the current deviation exceeding the threshold value, triggering, in real-time with reception of the event stream, an adjustment in performance of the task being performed by the machine.

13. A deviation detection system for event processing, comprising:
an adapter configured to receive at least one stream of event data from a machine that is generating events for the stream of event data, the event data including at least one attribute of performance of a task by the machine;
at least one processor configured to:
calculate a long-term value by using a first estimate of a long-term probability density function (PDF) of at least one monitored attribute in the at least one stream of event data over a long-term time window of the stream of event data;
calculate a short-term value by using a second estimate of a short-term PDF of the at least one monitored attribute in the at least one stream of event data over a short-term time window that is of a shorter duration than the first time window;
compute a first difference value between the calculated long-term value and an ideal density distribution;
compute a second difference value between the calculated short-term value and the ideal density distribution value;
compute a current deviation as a function of the first difference value and the second difference value;
compare the current deviation to a threshold value;
in response to the comparison of the current deviation exceeding the threshold value, trigger, in real-time with reception of the event stream, an adjustment in performance of the task being performed by the machine; and
repeat the calculating, computing, and comparing as further monitored events are generated by the machine for performance of the task and received in the at least one stream of event data.

14. The system of claim 13, wherein the short-term value is based on a short-term Kernel Density Estimator (KDE) and the long-term value is based on a long-term KDE.

15. The system of claim 13, wherein the processor is configured to update the long-term value with respect to a complete stream.

16. The system of claim 13, wherein the threshold value is specified by a user.

17. The system of claim 13, wherein the threshold value is dynamically determined by the processing system.

18. The system of claim 13, wherein the calculating of the long-term value includes using Cluster Kernels.

19. The system of claim 13, further comprising a user interface configured to display a result of the comparing of the current deviation to the threshold.

20. The system of claim 13, further comprising a data store configured to log information concerning detected deviations.

21. The system of claim 13, wherein the processor is configured to update the long-term value with summaries of re-sampled partitions of the stream.

22. The system of claim 13, wherein the computed current deviation is a difference between the first and second distances.

23. A non-transitory computer readable storage medium tangibly storing instructions that, when processed by at least one processor, executing a method according to claim 1.

* * * * *